United States Patent [19]
Honda et al.

[11] Patent Number: 5,392,845
[45] Date of Patent: Feb. 28, 1995

[54] AIR-CONDITIONING DEVICE

[75] Inventors: Yuuji Honda, Okazaki, Japan; Yuichi Kajino, Rancho Palos Verdes, Calif.; Takayoshi Kawai, Aichi, Japan; Yuji Ito, Ichinomiya, Japan; Katsuhiko Samukawa, Oobu, Japan

[73] Assignee: Nippondenso Co., Ltd., Kariya, Japan

[21] Appl. No.: 180,419

[22] Filed: Jan. 12, 1994

[30] Foreign Application Priority Data

Jan. 13, 1993 [JP] Japan .................................. 5-003810
Nov. 19, 1993 [JP] Japan .................................. 5-290462

[51] Int. Cl.6 .............................................. F25B 29/00
[52] U.S. Cl. ......................................... 165/12; 165/22; 165/42; 165/43; 236/46 F; 236/91 F; 236/DIG. 19; 62/158; 62/131
[58] Field of Search ....................... 165/12, 22, 42, 43; 236/91 F, 46 F; 62/158, 131

[56] References Cited

U.S. PATENT DOCUMENTS

| | | | |
|---|---|---|---|
| 4,274,265 | 6/1981 | Okumura | 62/158 |
| 4,538,760 | 9/1985 | Kobayashi | 236/91 F |
| 4,899,930 | 2/1990 | Kagohata et al. | 236/91 F |
| 5,293,928 | 3/1994 | Iida et al. | 165/43 |
| 5,311,746 | 5/1994 | Dombrowski et al. | 62/158 |

FOREIGN PATENT DOCUMENTS 62-199519 9/1987 Japan .
63-263125 10/1988 Japan .
4191118 7/1992 Japan .

*Primary Examiner*—John K. Ford
*Attorney, Agent, or Firm*—Cushman, Darby & Cushman

[57] ABSTRACT

An air-conditioning device capable of obtaining a suitable blow-out temperature through one passage from the initial period of change even when the air-conditioning operation in which either a first passage or a second passage is closed is changed into an operation condition in which it is opened. A feet mode in which the hot air is blown to the feet of a passenger from a second passage 7, is changed to a bilevel mode in which a first passage 6 that communicates with the upper half body of the passenger is switched from the closed state to the open state. During a predetermined period of time in the initial period following the change, the temperature blown from the first passage 6 is determined based upon a blow-out temperature of the second passage 7 and a desired blow-out temperature TAOV of the first passage 6. At the time of changing the mode, therefore, even when a first temperature sensor 25 is detecting a temperature near a desired blow-out temperature of the first passage 6 before the mode is changed, the air of the present temperature is not blown from the first passage 6 but, instead, a by-pass opening/closing damper 15 is opened, so that the air of a low temperature is blown from the first passage 6.

9 Claims, 11 Drawing Sheets

AIR-CONDITIONING DEVICE

BACKGROUND OF THE INVENTION

1. Field of the Invention

The present invention relates to an air-conditioning device, and more specifically to an air-conditioning device which conditions by blowing air streams of different temperatures from a first passage and a second passage.

2. Description of the Related Art

There has heretofore been known technology as disclosed in, for example, Japanese Unexamined Patent Publication (Kokai) No. 191118/1992. This technology is concerned with an air-conditioning device for vehicles in which an evaporator and a heater core are arranged in a duct. This air-conditioning device is provided with a cool air by-pass that guides the cool air that has passed through the evaporator directly to a first passage that blows the cool air to the upper half body of a passenger, in addition to a duct in which the heater core is contained. By controlling the flow rate of the cool air that passes through the cool air by-pass, the temperature of the air blown from the first passage is controlled to be lower than the temperature of the air that is blown from the second passage to the feet of the passenger.

The above technology, however, has the following inconveniences which will now be described by using a time chart of FIG. 13. That is, in the above-mentioned conventional air-conditioning device, when the temperature is first set at 25° C., a feet mode operation condition is established in which no air is blown from the first passage to the upper half body of the passenger but the hot air of 35° C. (desired blow-out temperature) is blown to the feet of the passenger from the second passage. Then, when the setpoint temperature is changed from 25° C. to 23° C. at a time t, the feet mode operation is automatically changed into a bilevel mode operation in which the air is blown from the first passage and the second passage, and the cool air of 25° C. (desired blow-out temperature) is blown to the upper half body of the passenger from the first passage.

During the feet mode operation before being changed, no air flows into the first passage. Therefore, a first temperature sensor provided in the first passage on the side close to the room detects the temperature of the air which is nearly the same as the temperature (e.g., 25° C.) in the room. Immediately after the change to the bilevel mode operation, therefore, the temperature detected by the first temperature sensor is the temperature in the room, i.e., 25° C. due to a delay in the detecting operation of the first temperature sensor. In the feet mode operation, the cool air by-pass remains closed. When the first temperature sensor is detecting the room temperature (e.g., 25° C.) immediately after the change to the high-level mode operation, the control device works to maintain this condition since the temperature 25° C. is the desired blow-out temperature from the first passage. That is, the control device operates with the cool air by-pass maintained closed. Then, the hot air of 35° C. which is the same as that of the second passage is guided to the first passage; i.e., the hot air is blown to the upper half body of the passenger as shown in FIG. 13 and the passenger feels uncomfortable.

Furthermore, when the bilevel mode operation is changed to a face mode in which the cool air is blown to the upper half body of the passenger from the first passage, and is then changed again into the bilevel mode operation in which the hot air is blown to the feet of the passenger from the second passage, the second temperature sensor in the second passage detects the room temperature until the operation is changed into the bilevel mode. When the temperature detected by the second temperature sensor is just the same as the desired blow-out temperature of the second passage or is close to the desired temperature at a moment when the operation is changed into the bilevel mode operation, the cool air is blown from the second passage during the initial period in which the operation is changed into the bilevel mode operation causing the passenger to feel uncomfortable.

SUMMARY OF THE INVENTION

The present invention was accomplished in view of the above-mentioned circumstances, and its object is to provide an air-conditioning device which, when the air-conditioning operation is started with its one passage opened from the air-conditioning operation condition in which either the first passage or the second passage is closed, blows air of a suitable temperature from the one passage during the initial period in which the operation is changed.

In order to accomplish the above-mentioned object, the present invention provides an air-conditioning device which has the following technical constitution.

That is, according to a first aspect of the present invention, there is provided an air-conditioning device comprising, a main passage through which the air flows into the room; a first passage branched from the main passage; a second passage branched from the main passage; a passage opening/closing means which opens or closes the first passage and the second passage; a first temperature adjusting means which adjusts the temperature of the air passing through the first passage; a second temperature adjusting means which adjusts the temperature of the air passing through the second passage; a first temperature sensor which detects the temperature of the air passing through the first passage; a second temperature sensor which detects the temperature of the air passing through the second passage; a first blow-out temperature determining means which determines a desired blow-out temperature of the air blowing out from the first passage; a second blow-out temperature determining means which determines a desired blow-out temperature of the air Blowing out from the second passage; a judging means which judges whether either one of the first passage or the second passage is shifted from the closed state to the open state by the passage opening/closing means; a first control means which, when it is so judged by the judging means that the either one of the passages is shifted from the closed state to the open state, works to control the temperature adjusting means of the one passage for a predetermined period of time immediately after the judgement based upon a desired blow-out temperature of the other passage of either the first passage or the second passage and upon the desired blow-out temperature of the one passage; and a second control means which, after the predetermined period of time has passed immediately after the judgement, works to control the temperature adjusting means of the one passage based upon a value detected by the temperature sensor provided in the one passage and upon the desired blow-out temperature of the one passage.

According to a second aspect of the present invention, furthermore, there is provided an air-conditioning device comprising, a main passage through which the air flows into the room; a first passage branched from the main passage; a second passage branched from the main passage; a passage opening/closing means which opens or closes the first passage and the second passage; a temperature adjusting means which adjusts the temperature of the air passing through the first passage; a temperature sensor which detects the temperature of the air passing through the first passage; a blow-out temperature determining means which determines a desired blow-out temperature of the air blowing out from the first passage; a judging means which judges whether the first passage is shifted from the closed state to the open state by the passage opening/closing means; a first control means which, when it is so judged by the judging means that the first passages is shifted from the closed state to the open state, works to control the temperature adjusting means for a predetermined period of time immediately after the judgement based upon a desired blow-out temperature of the second passage and upon the desired blow-out temperature of the first passage; and a second control means which, after the predetermined period of time has passed immediately after the judgement, works to control the temperature adjusting means based upon a temperature detected by the temperature sensor and upon the desired blow-out temperature of the first passage.

That is, in the air-conditioning device according to the first aspect of the present invention, the judging means judges that one passage is shifted from the closed state to the open state at a moment when the air-conditioning operation in which either the first passage or the second passage is closed is changed into the operation in which it is opened. Then, the first control means operates for a predetermined period of time to control the temperature adjusting means in one passage based upon a desired blow-out temperature of the other passage (temperature detected by the temperature sensor in the other passage, desired blow-out temperature of the other passage, or predetermined virtual temperature of the other passage) and upon a desired blow-out temperature of one passage determined by the blow-out temperature determining means, so that the air of the desired blow-out temperature of one passage is blown from the one passage. Then, as a predetermined period of time passes, the second control means operates to control the temperature adjusting means of one passage based upon the temperature detected by the temperature sensor provided in one passage and upon the desired blow-out temperature of one passage determined by the blow-out temperature determining means, so that the air of the desired blow-out temperature of one passage is blown from one passage. That is, the desired blow-out temperature defined by the present invention may be a temperature which is practically detected by the sensor in the passage which is of concern, or a desired blow-out temperature which will be used as will be described later, or a predetermined appropriate temperature. This can also be referred to as a substitute temperature.

In the air-conditioning device according to the second aspect of the present invention, on the other hand, the judging means judges that the first passage is shifted from the closed state to the open state when the air-conditioning operation in which the first passage is closed is changed into the air-conditioning operation in which it is opened. Then the first control means operates for a predetermined period of time to control the temperature adjusting means based upon a desired blow-out temperature or a substitute temperature of the second passage (a temperature detected by the temperature sensor when it is provided in the second passage, a desired blow-out temperature determined by the blow-out temperature determining means when it is provided to determine the blow-out temperature of the second passage, or a predetermined virtual temperature of the second passage) and upon a desired blow-out temperature determined by the blow-out temperature determining means, so that the air of the desired blow-out temperature is blown out from the first passage. As a predetermined period of time passes, the second control means works to control the temperature adjusting means based upon the temperature detected by the temperature sensor and the desired blow-out temperature determined by the blow-out temperature determining means, so that the air of the desired blow-out temperature is blown out from the first passage.

DETAILED DESCRIPTION OF THE PREFERRED EMBODIMENTS

Figure 1:
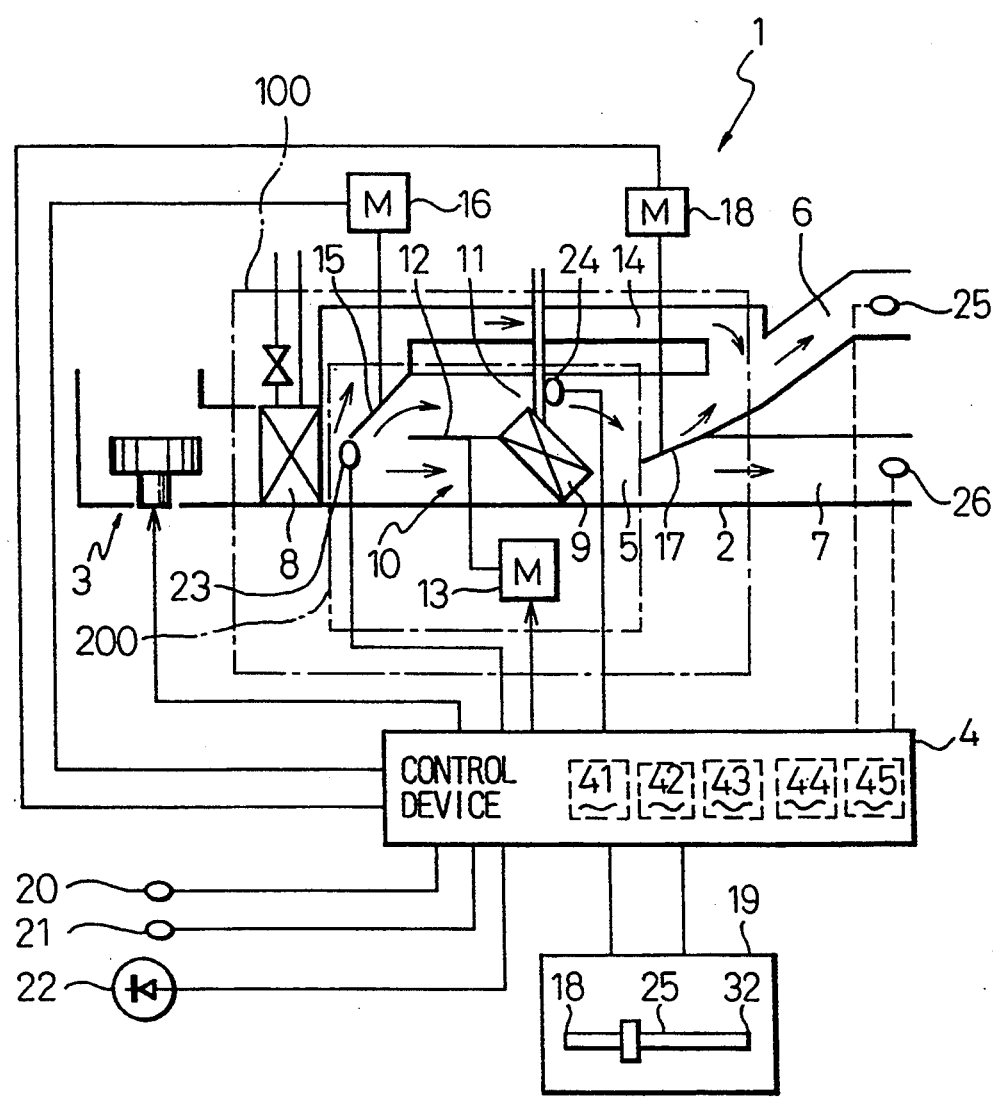
FIG. 1 is a diagram which schematically illustrates an embodiment of an air-conditioning device for automotive use according to one aspect of the present invention.

The concrete constitution of the air-conditioning device according to the present invention will now be described in detail with reference to the drawings. FIG. 1 is a diagram illustrating the constitution of the air-conditioning device of an embodiment according to a first aspect of the present invention. That is, FIG. 1 illustrates an air-conditioning device 1 comprising a main passage 5 through which the air flows into the room; a first passage 6 branched from the main passage; a second passage 7 branched from the main passage; a passage opening/closing means 17 which opens or closes the first passage and the second passage; a first temperature adjusting means 100 which adjusts the temperature of the air passing through the first passage 6; a second temperature adjusting means 200 which adjusts the temperature of the air passing through the second passage 7; a first temperature sensor 25 which detects the temperature of the air passing through the first passage 6; a second temperature sensor 26 which detects the temperature of the air passing through the second passage 7; a first blow-out temperature determining means 41 which determines a desired blow-out temperature of the air blowing out from the first passage 6; a second blow-out temperature determining means 42 which determines a desired below-out temperature of the air blowing out from the second passage 7; a judging means 43 which judges whether either one of the first passage 6 or the second passage 7 is shifted from the closed state to the open state by the passage opening/closing means 17; a first control means 44 which, when it is so judged by the judging means 43 that the either one of the passages is shifted from the closed state to the open state, works to control the temperature adjusting means 100 or 200 of one passage for a predetermined period of time immediately after the judgement based upon a desired blow-out temperature (substitute temperature) of the other passage of either the first passage 5 or the second passage 7, and upon the desired blow-out temperature of one passage; and a second control means 45 which, after the predetermined period of time has passed immediately after the judgement, works to control the temperature adjusting means 100 or 200 of the one passage based upon a temperature detected by the temperature sensor 25, 26 provided in the one passage, and upon the desired blow-out temperature of said one passage.

The air-conditioning device 1 of the present invention will be described in further detail by way of embodiments.

Embodiment 1

FIGS. 1 to 6 illustrate an embodiment according to a first aspect of the present invention, wherein FIG. 1 is a diagram which schematically illustrates the constitution of an air-conditioning device for automotive use. That is, the air-conditioning device 1 has a duct 2 for sending the air into a room. On the upstream side of the duct 2 is provided a blower 3 equipped with an internal air/external air switching means (not shown) that introduces the internal air or the external air into the intake port in a switched manner. The blower 3 creates an air stream in the duct 2 that is headed into the room, and the blow rate is controlled by a control device 4 that will be described later.

The duct 2 is equipped with a main passage 5 on the upstream side, a first passage 6 that is branched from the main passage 5 to blow chiefly cool air to the upper half body of a passenger, and a second passage 7 that is branched from the main passage 5 to blow chiefly hot air to the feet of the passenger. On the upstream side of the main passage 5 is provided an evaporator 8 (cooling means) that cools the air passing through the passage. The evaporator 8 is a part which constitutes the refrigeration cycle, and is operated as the refrigeration cycle is controlled by the control device 4 that will be described later.

In the main passage 5 on the downstream side of the evaporator 8 is provided a heater core 9 (heating means) that heats the air passing through the passage. Being served with the cooling water (hot water) of the engine for running the vehicle (not shown), the heater core 9 heats the air that passes through the main passage 5. The main passage 5 is further provided with a heating amount-adjusting means 10 for adjusting the heating of the air by the heater core 9. The heating amount-adjusting means 10 comprises a heat-adjusting by-pass 11 that is provided in the main passage 5 so as to by-pass the heater core 9, and an air-mix damper 12 that adjusts the amount of the air passing through the heater core 9 and the amount of the air that passes through the heat-adjusting by-pass 11. The opening degree of the air-mix damper 12 is controlled by an actuator 13 which is controlled by the control device 4 that will be described later.

Moreover, the duct 2 is provided with a cool air by-pass 14 that guides the cool air that has passed through the evaporator 8 directly into the first passage 6 by-passing the heating amount-adjusting means 10. On the upstream side of the cool air by-pass 14 is provided a by-pass opening/closing damper 15 (by-pass opening/closing means) that opens and closes the cool air by-pass means 14 and adjusts the opening degree. The by-pass opening/closing damper 15 is driven by an actuator 16 which is controlled by the control device 4 that will be described later.

The temperature of the air passing through the first passage 6 is adjusted by the heating-amount adjusting means 10, cooling air by-pass 14, and by-pass opening/closing damper 15. The heating amount-adjusting means 10, cool air by-pass 14, and by-pass opening/closing damper 15 constitute the first temperature adjusting means 100 of the present invention.

The temperature of the air passing through the second passage 7 is adjusted by the heating amount-adjusting means 10 which constitutes the second temperature adjusting means 200 of the present invention.

At a portion where the first passage 6 and the second passage 7 are branched, there is provided a passage opening/closing damper 17 (passage opening/closing means) which closes the first passage 6 and opens the second passage 7, closes the second passage 7 and opens the first passage 6, or opens both the first passage 6 and the second passage 7. The passage opening/closing damper 17 is driven by an actuator 18 which is controlled by the control device 4 that will be described later.

The control device 4 mounts a computer and controls electric parts of the air-conditioning device depending upon the conditions manipulated by the passenger and the input values from the sensors. The control device 4 is equipped with an operation panel (not shown) which will be manipulated by the passenger. The operation panel is equipped with an automatic air-conditioning switch (not shown), a variety of mode change-over switches (not shown) as well as a temperature setting device 19 for setting the temperature in the room. The control device 4 further has a variety of sensors such as an internal air sensor 20 that detects the temperature in the room, an external air sensor 21 that detects the temperature outside the room, a solar radiation sensor 22 that detects the amount of solar radiation falling on the room, an after-the-evaporator sensor 23 that detects the temperature of the air that has passed through the evaporator 8, a water temperature sensor 24 that detects the temperature of the cooling water in the heater core 9, a first temperature sensor 25 that detects the temperature of the air passing through the first passage 6 and detects the temperature of the air blown to the upper half body of the passenger, and a second temperature sensor 26 that detects the temperature of the air passing through the second passage 7 and detects the temperature of the air blown to the feet of the passenger. Both the first temperature sensor 25 and the second temperature sensor 26 are arranged at positions where they detect the temperature in the room under the condition where no air stream is flowing through the passage.

When the automatic air-conditioning is selected by the user, the control device 4 automatically controls the blow-out temperature, blow rate and blow port, so that the temperature in the room is maintained at a temperature set by the temperature setting device 19. In order to carry out the automatic air-conditioning, the control device 4 calculates a required blow-out temperature TAO in compliance with the following equation (1) based upon the sensor signals that are input, $$TAO = Kset \cdot Tset - Kr \cdot Tr - KAM \cdot Tam - Ks \cdot Ts - C \quad (1)$$

where Kset, Kr, Kam, Ks and C are constants for correction, Tset is a setpoint temperature signal of the temperature setting device 19, Tr is a detected temperature signal of the internal air sensor 20, Tam is a detected temperature signal of the external sensor 21, and Ts is a detected solar radiation signal of the solar radiation sensor 22.

Figure 2:
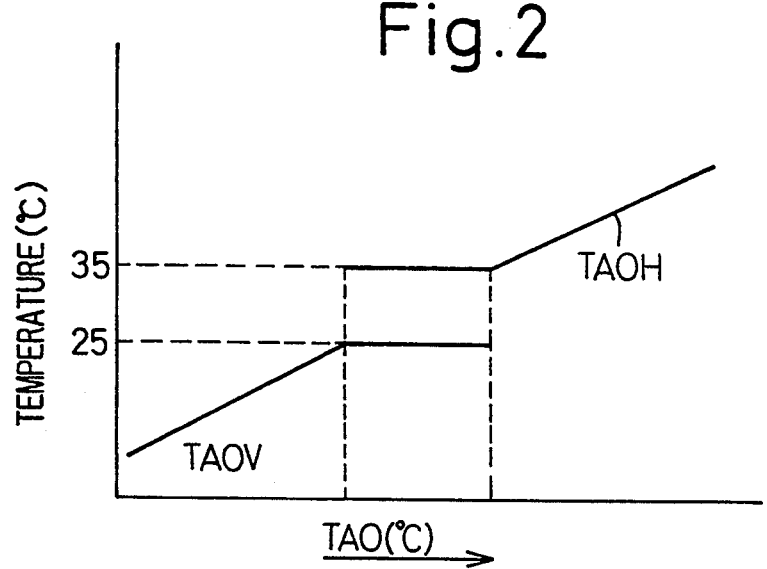
FIG. 2 is a graph illustrating a relationship among a required blow-out temperature TAO and desired blow-out temperatures TAOV, TAOH of the first and second passages employed in the present invention.

Then, as shown in FIG. 2, the desired blow-out temperature TAOV of the first passage 6 and the desired blow-out temperature TAOH of the second passage 7 are determined from the thus calculated required blow-out temperature TAO. The operation for determining the desired blow-out temperature TAOV of the first passage 6 from the required blow-out temperature TAO is is carried out by the first blow-out temperature determining means 41, and the operation for determining the desired blow-out temperature TAOH of the second passage 7 from the required blow-out temperature TAO is carried out by the second blow-out temperature determining means 42.

In the face mode operation (first passage 6 is opened, second passage 7 is closed) in which the cool air is chiefly blown to the upper half body of the passenger and in the feet mode operation (first passage 6 is closed, the second passage 7 is opened) in which the hot air is chiefly blown to the feet of the passenger, the cool air by-pass 14 is closed by the by-pass opening/closing damper 15 in a manner as shown in Table 1 blow, and air of a temperature determined by the desired blow-out temperatures TAOV and TAOH is blown out from the passages.

In the bilevel mode operation as shown in FIG. 2, furthermore, the desired blow-out temperature TAOV of the air blown from the first passage 6 and the desired blow-out temperature TAOH of the air blown from the second passage 7 are separately found. Moreover, the desired blow-out temperature TAOH is controlled by the opening degree SWn of the air-mix damper 12 and the desired blow-out temperature TAOV is controlled by the opening degree SWn of the air-mix damper 12 and the opening degree SWBn of the by-pass opening/closing damper 15.

TABLE 1

| Blow-out mode | Desired blow-out temp. | Opening degree of A/M Damper | Opening degree of by-pass opening/closing damper |
|---|---|---|---|
| Face | TAOV | SWn | Closed |
| Bilevel | TAOV | — | SWBv |
| | TAOH | SWn | — |
| Feet | TAOH | SWn | Open |

The opening degree SWn of the air-mix damper 12 and the opening degree SWBn of the by-pass opening/closing damper 15 are found by calculation of the following equations (2) to (5) relying upon the temperature TAV of the air blown to the upper half body detected by the first temperature sensor 25, the temperature TAH of the air blown to the feet detected by the second temperature sensor 26, and their differences from the desired blow-out temperatures, $$En = TAOH - TAH \quad (2)$$

$$EBn = TAV - TAOV \quad (3)$$

$$SWn = SW_{n-1} + kp\{(En - E_{n-1} + \theta \cdot En/Ti + T \cdot d(En - 2E_{n-1} + E_{n-2})/\theta\} \quad (4)$$

$$SWBn = SWB_{n-1} + kp\{EBn - EB_{n-1} + \theta \cdot EBn /Ti + Td(EB_{n-2}EB_{n-1} + 2EB_{n-2})/\theta\} \quad (5)$$

where n−1 is a value of θ seconds of a control period before the value n of this time, n−2 is a value of θ seconds of a control period before the value n−1 of the previous time, kp is a proportional gain, Ti is an integration time, and Td is a differentiation time.

Figure 3:
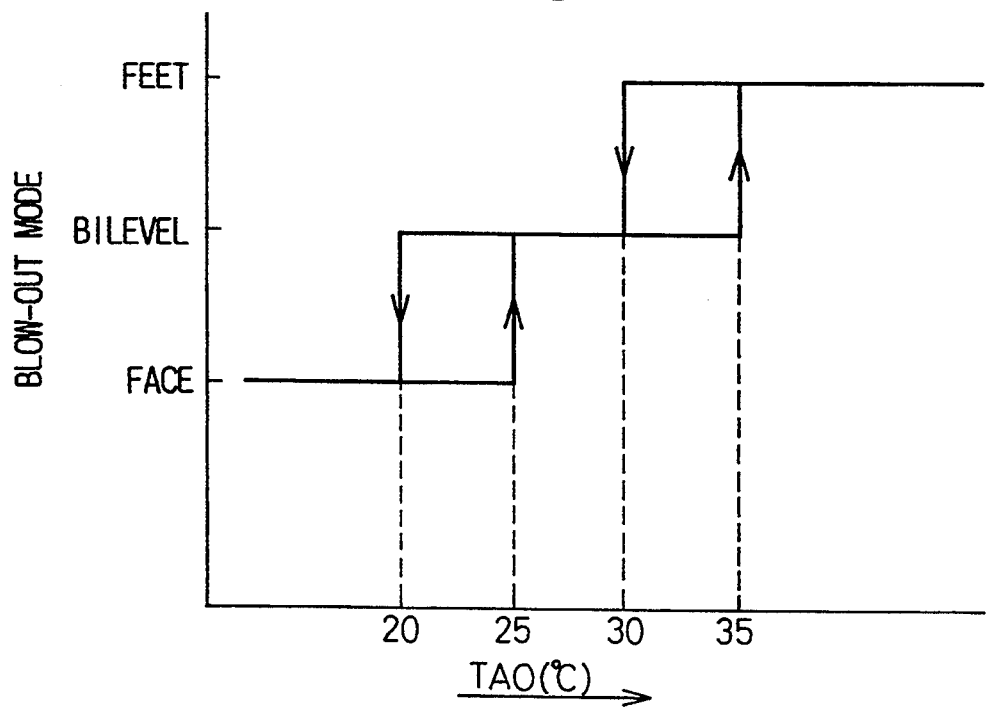
FIG. 3 is a graph illustrating a relationship between the required blow-out temperature TAO and the blow-out mode employed in the present invention.

The blow-out mode includes an automatic blow-out control which is automatically set from the required blow-out temperature TAO and FIG. 3, and the manual setting that is manually set by the passenger.

The control device 4 is provided with a first blow-out temperature determining means 41 which determines the desired blow-out temperature TAOV of the first passage 6 during the face mode operation and the bi-level mode operation based on the required blow-out temperature TAO.

The control device 4 is provided with a second blow-out temperature determining means 42 which determines the desired blow-out temperature TAOH of the second passage 7 during the feet mode operation and the bilevel mode operation based on the required blow-out temperature TAO.

The control device 4 is provided with a judging means 43 which judges whether either one of the first passage 6 or the second passage 7 is shifted from the closed state to the open state.

The control device 4 is provided with a first control means 44 which, when it is judged by the judging means 43 that either the first passage 6 or the second passage 7 is shifted from the closed state to the open state, controls the blow-out temperature of the one passage for a predetermined period of time (three periods in this embodiment) based upon a desired blow-out temperature such as a desired blow-out temperature of the other passage and upon a desired blow-out temperature of the one passage determined by the first blow-out temperature determining means 41 or the second blow-out temperature determining means 42, instead of using the temperature that is detected by the temperature sensor (the first temperature sensor 25 or the second temperature sensor 26) of the one passage. In the present invention, the predetermined period of time can be determined, for example, by a time in which the whole procedure of the control flow chart described later is repeated several times, or is repeated three times in this embodiment.

The control device 4 is further provided with a second control means 45 which controls the blow-out temperature of the one passage based upon a temperature detected by the temperature sensor (the first temperature sensor 25 or the second temperature sensor 26) of the one passage and upon the desired blow-out temperature of the one passage determined by the first blow-out temperature determining means 41 or the second blow-out temperature determining means 42.

Figure 4:
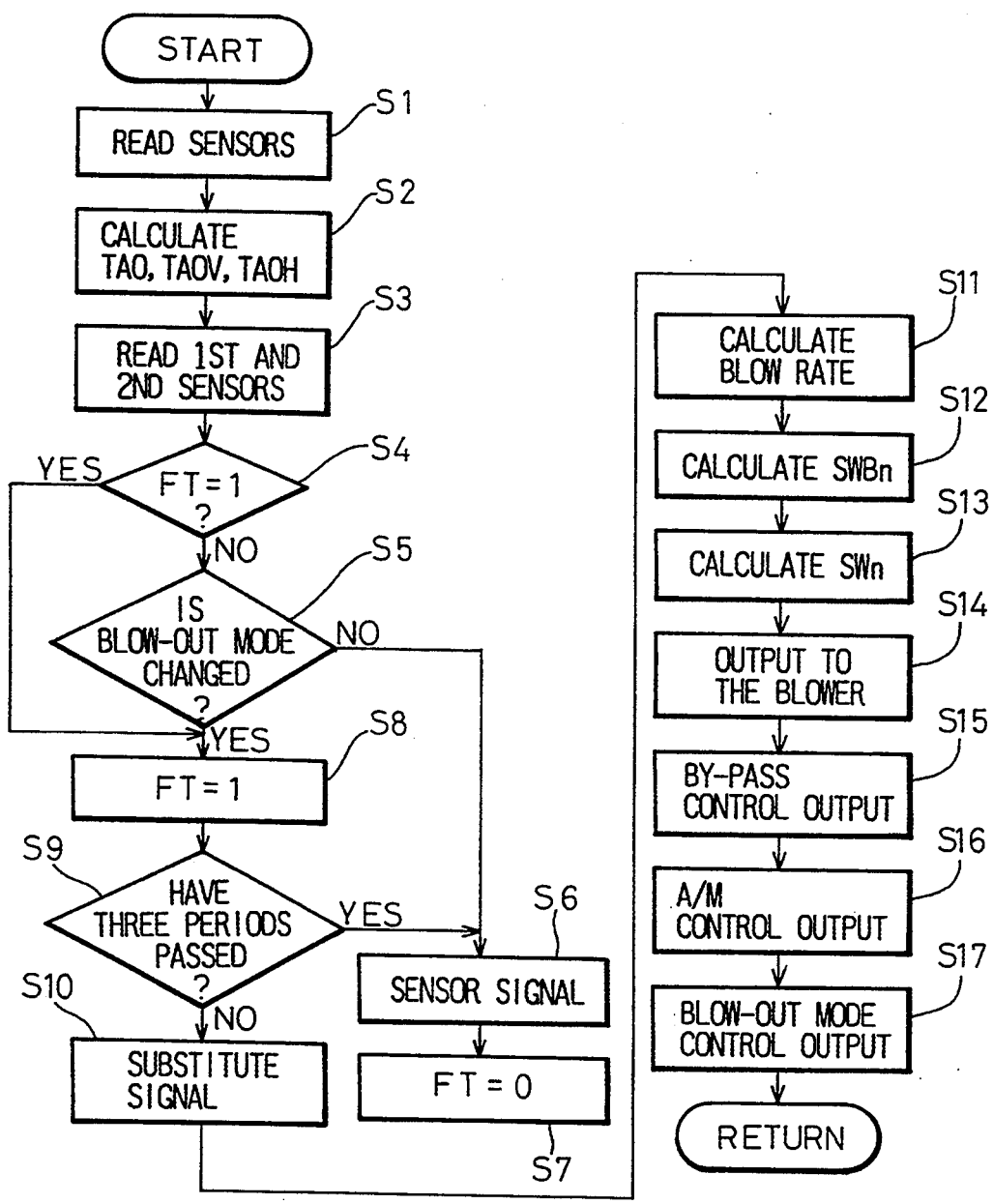
FIG. 4 is a flowchart illustrating the operation of a control device used for the device according to the present invention shown in FIG. 1.
Figure 5:
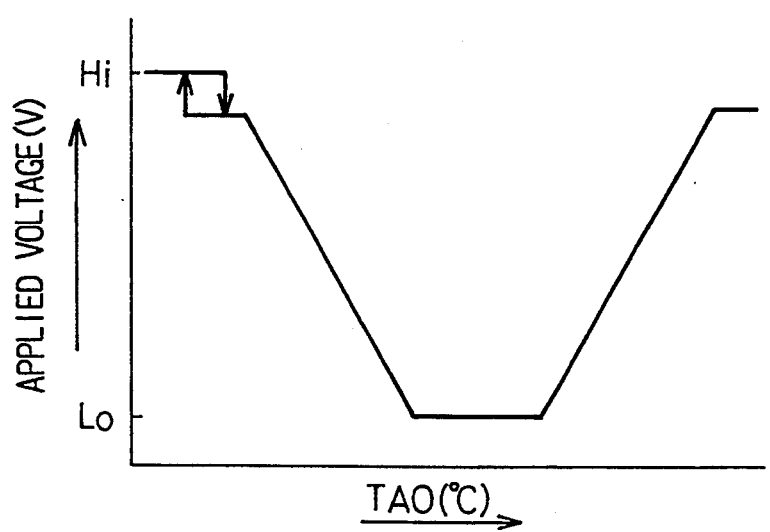
FIG. 5 is a graph showing a relationship between the required blow-out temperature TAO and the voltage applied to a blower employed in the present invention.

The operation of the control device 4 will now be described by using the flowchart of FIG. 4.

As the automatic air-conditioning is selected (started), first, a step S1 reads the output value of the sensor for calculating a required blow-out temperature TAO. A step S2 calculates the required blow-out temperature TAO and desired blow-out temperatures TAOV and TAOH (operation of first and second blow-out temperature determining means 41, 42). A step S3 reads temperatures detected by the first temperature sensor 25 and the second temperature sensor 26.

Then, a step S4 judges whether a flag FT that represents the initial state in which the blow-out mode is changed is 1 or not. When the result of judgement is NO, a step S5 judges whether the blow-out mode is changed from the feet mode to the bilevel mode or the face mode, or is changed from the face mode to the bilevel mode or the feet mode (operation of the judging means 43 of the invention). When the result of judgement is NO, a step S6 calculates a difference between the temperature detected by the first temperature sensor 25 or the second temperature sensor 26 and the desired blow-out temperature (TAOV, TAOH) in the passage in compliance with the above-mentioned equation (2) or (3) (operation of the second control means 45). Then, at a step S7, the flag FT which is 1 is set to 0, and the program proceeds to a step S11.

When the result of judgement at the step S4 or the step S5 is YES, on the other hand, the flag FT is set to 1 at a step S8. After the step S8 is executed or when the result of judgement at the step 84 is YES, a step S9 judges whether the all the steps of the control flowchart are to be repeated, for example, three times under the condition where the flag FT is 1. When the result of judgement is YES, the program proceeds to the step S6. When the result of judgement is NO, the processing is executed at a step S10 to calculate the equations (2) and (3) (operation of the first control means 44) by using a substitute temperature (e.g., a desired blow-out temperature of the other passage) instead of using the temperature detected by the first temperature sensor 25 or the second temperature sensor 26 as TAR and TAV of the equations (2) and (3). The program then proceeds to a step S11.

The substitute temperature or the desired blow-out temperature in the passage according to this embodiment is the desired blow-out temperature TAOH of the second passage 7 instead of the temperature detected by the first temperature sensor 25 when the feet mode operation is changed to the bilevel mode operation, and is the desired blow-out temperature TAOH of the feet mode operation instead of the temperature detected by the first temperature sensor 25 when the feet mode operation is changed to the face mode operation. When the face mode operation is changed to the bilevel mode operation, furthermore, the substitute temperature employs the desired blow-out temperature TAOV of the first passage 6 instead of the temperature detected by the second temperature sensor 26 and when the face mode operation is changed to the feet mode operation, the substitute temperature employs the desired blow-out temperature TAOV of during the face mode operation instead of the temperature detected by the second temperature sensor 26.

A step S11 calculates a voltage applied to the blower 3. The voltage applied to the blower 3 is determined depending upon the required blow-out temperature TAO and FIG. 5 in the case of the automatic control and is determined depending upon the blow rate indicated on the operation panel in the case of the manual control. Next, a step S12 calculates the opening degree SWBn of the by-pass opening/closing damper 15 in compliance with the equations (3) and (5) using a difference EBn Calculated at the steps S6 and S10 (operations of the first and second control means 44 and 45 are included). Then, a step S13 calculates the opening degree SWn of the air-mix damper 12 in compliance with the equations (2) and (4) using a difference En calculated at the steps S6 and S10 (operations of the first and second control means 44 and 45 are included).

A step S14 applies the above-found voltage to the blower 3. A step S15 outputs a control signal to the actuator 16 that drives the by-pass opening/closing damper 15 so that the above-found desired opening degree SWBn (face mode and feet mode are closed) is obtained (operations of the first and second control means 44 and 45 are included). A step S16 outputs a control signal to the actuator 13 that drives the air-mix damper 12 so that the above-found desired opening degree SWn is obtained (operations of the first and second control means 44 and 45 are included). A step S17 outputs a control signal to the actuator 18 that drives the passage opening/closing damper 17, so that the blow-out mode is obtained that is determined from the required blow-out temperature TAO and FIG. 3 or so that the blow-out mode is obtained that is set by the manual control. The program then returns.

Figure 6:
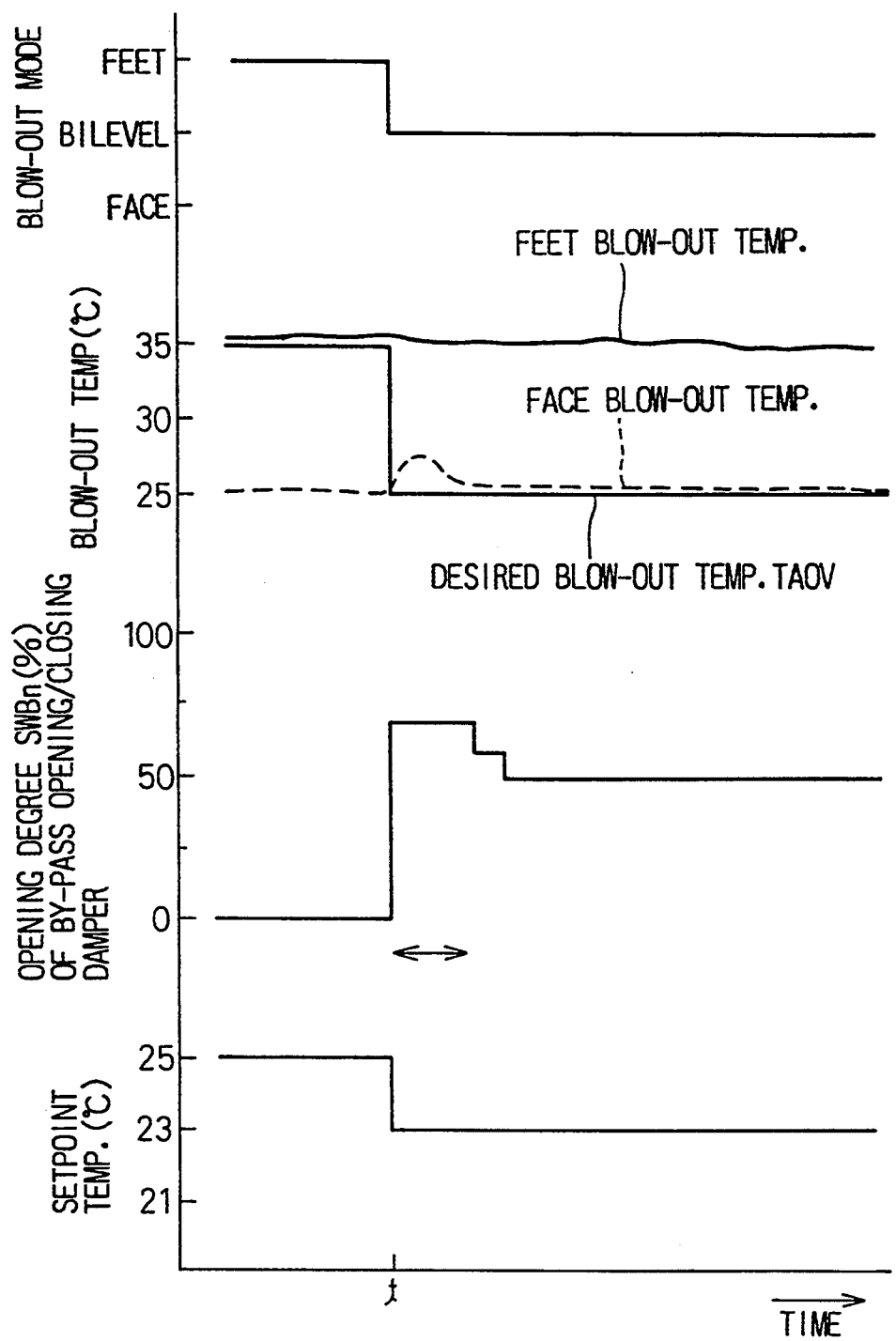
FIG. 6 is a time chart illustrating the operation of the device according to the present invention shown in FIG. 1.

The operation of the above-mentioned embodiment will now be described by using the time chart of FIG. 6.

First, when the temperature is set at 25° C., the feet mode operation condition is established in which no air stream is blown from the first passage 6 to the upper half body of the passenger but the hot air of 35° C. is blown to the feet of the passenger from the second passage 7. Then, when the setpoint temperature drops to 23° C. at a time t, the feet mode operation is automatically changed to the bilevel mode operation in which the cool air of 25° C. is blown from the first passage 6 to the upper half body of the passenger.

Immediately after the operation is changed, however, the first temperature sensor 25 which has been exposed to the air of a temperature nearly the same as the temperature in the room detects the temperature, i.e., detects 25° C. because of delay in the detecting operation.

During three periods (about 12 seconds) immediately after the operation is changed, however, this embodiment does not employ the temperature detected by the first temperature sensor 25. Instead, the embodiment controls the amount of the air passing through the cool air by-pass 14 by controlling the opening degree SwBn of the by-pass opening/closing damper 15 based upon the desired blow-out temperature represented by the desired blow-out temperature TAOH of the second passage 7 and the desired blow-out temperature TAOV of the first passage. Thus, the cool air is blown out from the first passage 6 even during the initial period of change by controlling the opening degree SWBn of the by-pass opening/closing damper 15 based upon the desired blow-out temperature TAOH of the second passage 7 and the desired blow-out temperature of the first passage 6.

After the passage of three periods from when the blow-out mode was changed from the feet mode to the bilevel mode, the delay in the detecting operation of the first temperature sensor 25 is eliminated, and the temperature of the air blown out from the first passage 6 is controlled by feedback so that the temperature of 25° C. is detected by the first temperature sensor 25.

According to this embodiment as described above, even in the initial period immediately after the blow-out mode was changed to the bilevel mode from the feet mode, the opening degree SWBn of the by-pass opening/closing damper 15 is controlled based upon, for example, the desired blow-out temperature TAOM of the second passage 7 and the desired blow-out temperature of the first passage 6, in order that the air blown out from the first passage 6 is maintained at a low temperature. This makes it possible to free the passenger from feeling uncomfortable as when the hot air is blown to his upper half body in the initial period immediately after the feet mode is changed to the bilevel mode.

Even in the initial period immediately after the feet mode is changed to the face mode, the opening degree SWBn of the by-pass opening/closing damper 15 is controlled based upon, for example, the desired blow-out temperature TAOH of the second passage 7 during the feet mode and the desired blow-out temperature of the first passage 6, in order that the air blown out from the first passage 6 is maintained at a low temperature. This makes it possible to liberate the passenger from feeling uncomfortable as when the hot air is blown to the upper body half in the initial period immediately after the feet mode operation is changed to the face mode operation.

Or, even in the initial period immediately after the face mode is changed to the bilevel mode, the opening degree SWn of the air-mix damper 12 is controlled based upon, for example, the desired blow-out temperature TAOV of the first passage 6 which serves as a substitute temperature and the desired blow-out temperature of the second passage 7, in order that the air blown out from the second passage 7 is maintained at a high temperature. This makes it possible to liberate the passenger from feeling uncomfortable as when the cool air is blown to the feet in the initial period immediately after the face mode is changed to the bilevel mode.

Moreover, even in the initial period immediately after the face mode is changed to the feet mode, the opening degree SWn of the air-mix damper 12 is controlled based upon the desired blow-out temperature TAOV of the first passage 6 of during the face mode, in order that the air blown out from the second passage 7 is maintained at a high temperature. This makes it possible to liberate the passenger from feeling uncomfortable as when the cool air is blown to the feet in the initial period immediately after the face mode is changed to the feet mode.

Embodiment 2

Figure 7:
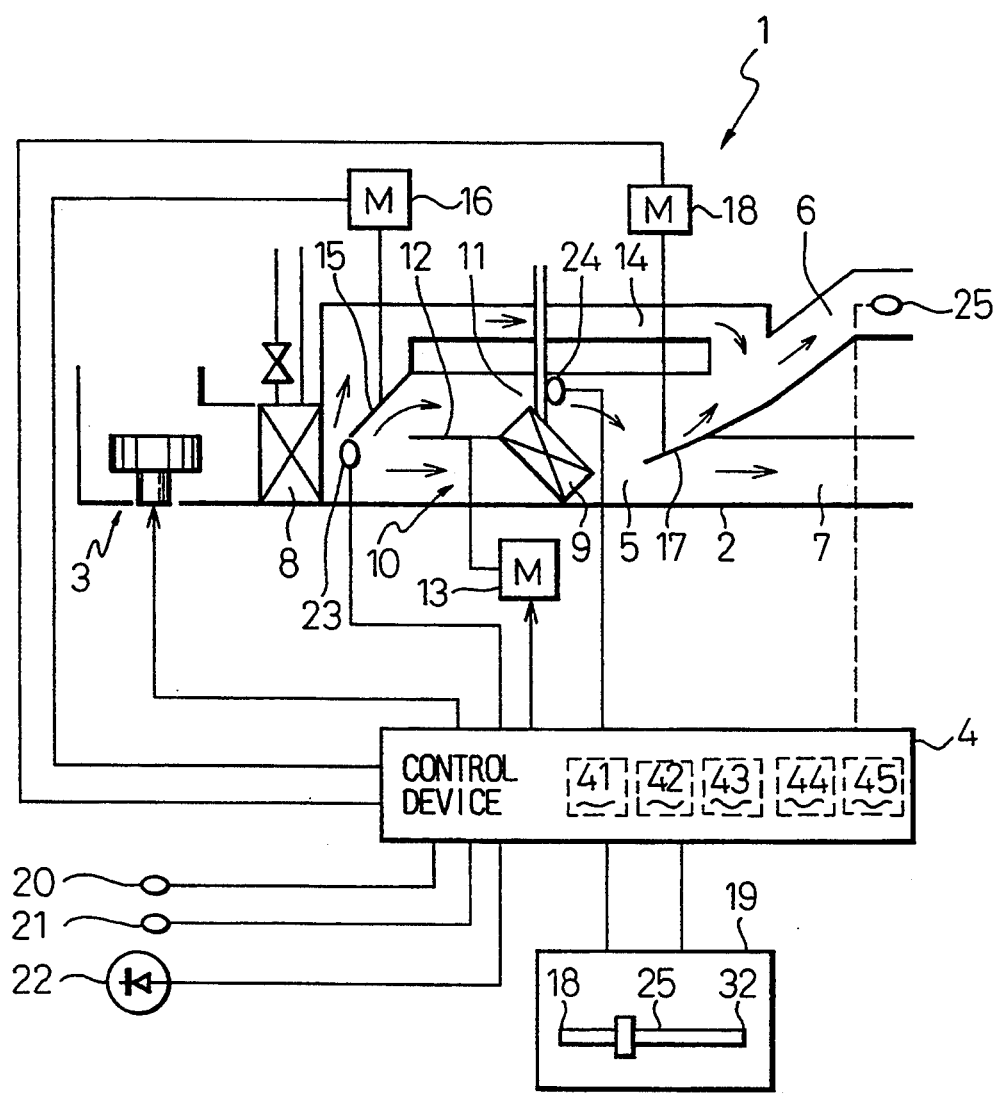
FIG. 7 is a diagram which schematically illustrates the constitution of an embodiment of the air-conditioning device according to a second aspect of the present invention.
Figure 8:
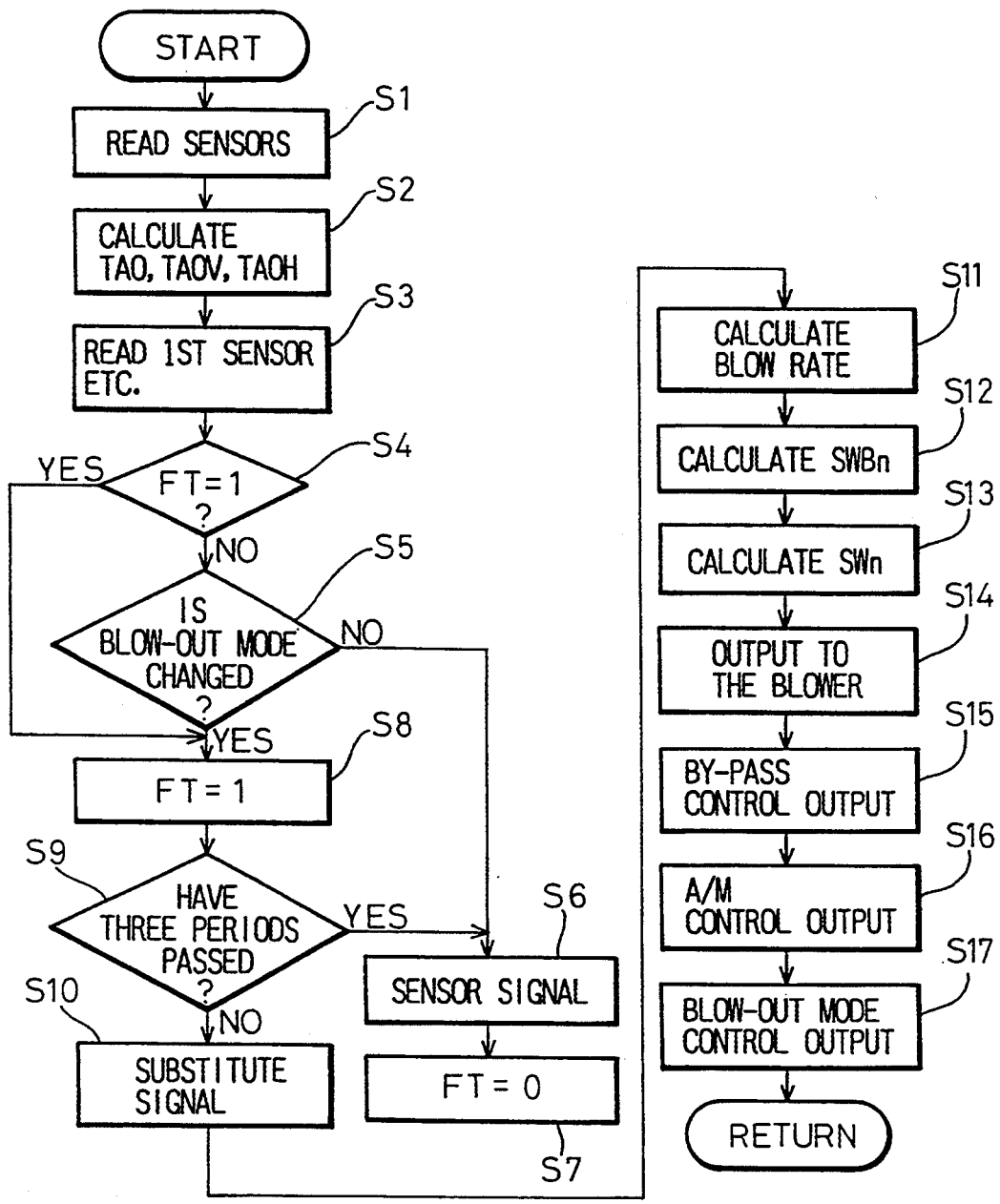
FIG. 8 is a flowchart illustrating the operation of the control device according to the embodiment shown in FIG. 7.

FIGS. 7 and 8 illustrate an embodiment according to the second aspect of the present invention, wherein FIG. 7 is a diagram which schematically illustrates the constitution of the air-conditioning device 1 for automotive use.

According to this embodiment, the blow-out temperature of the first passage 6 is controlled by a combination of a feedforward control and a feedback control using the first temperature sensor 25 but without using the second temperature sensor 26 in the second passage 7 that was employed in the first embodiment, in order that the blow-out temperature of the second passage 7 is controlled by the feedforward control only.

The same reference numerals as those of the first embodiment denote those which carry out the same operations. The heating amount-adjusting means 10 that adjusts the temperature of the air passing through the first passage 6, cool air by-pass passage 14 and by-pass opening/closing damper 15 constitute the aforementioned temperature adjusting means 100.

The control device 4 of this embodiment uses the aforementioned substitute temperature or the desired blow-out temperature as the blow-out temperature of the second passage 7. In order to execute the feedforward control operation, furthermore, the control device 4 of this embodiment calculates the opening degree SWn of the air-mix damper 12 in compliance with the following equation (6) by using the desired blow-out temperature TAOH of the second passage 7, a temperature TE detected by the after-the-evaporator sensor 23 and a temperature TW detected by the water temperature sensor 24.

$$SWn = (TAOH - TE)/(TW - TE) \times 100 (\%) \qquad (6)$$

Furthermore, the air-mix damper 12 of this embodiment is provided with a potentiometer (not shown) that reads the opening position of the air-mix damper 12.

The control device 4 so controls the air-mix damper 12 that the opening degree SWn of the air-mix damper 12 calculated by using the equation (6) comes into agreement with the opening degree detected by the potentiometer.

The judging means 43 according to this embodiment judges whether the blow-out mode has changed from the feet mode to the bilevel mode or to the face mode, i.e., whether the first passage 6 is changed from the closed state to the open state or not.

When it is judged that the first passage 6 is changed from the closed state to the open state, the first control means 44 of this embodiment controls the blow-out temperature of the first passage 6 for a predetermined period of time (three periods even in this embodiment) based upon the desired blow-out temperature TAOH of the second passage 7 instead of the temperature detected by the first temperature sensor 25 of the first passage 6 and upon the desired blow-out temperature TAOV of the first passage 6 determined by the first blow-out temperature determining means 41.

After a predetermined period of time has passed from when it is judged by the judging means 43 that the first passage 6 is changed from the closed state to the open state, the second control means 45 controls the blow-out temperature of the first passage 6 based upon the temperature detected by the first temperature sensor 25 of the first passage 6, and upon the desired blow-output temperature TAOV of the first passage 6 determined by the first blow-out temperature determining means 41.

The operation of the control device 4 of this embodiment is illustrated in the flowchart of FIG. 8.

The operation of this embodiment is different from the operation of the flowchart (see FIG. 4) of the first embodiment with respect to steps S3, S5 and S13.

In this embodiment which does not have the second temperature sensor 26 (see embodiment 1), the step S3 reads the temperatures detected by the after-the-evaporator sensor 23, water-temperature sensor 24 and first temperature sensor 25. The step S5 judges whether the blow-out mode has changed from the feet mode to the bilevel mode or has changed from the feet mode to the face mode. The step S13 calculates the opening degree SWn of the air-mix damper 12 in compliance with the above equation (6).

According to this embodiment as in the first embodiment, even in the initial period immediately after the blow-out mode is changed from the feet mode to the bilevel mode, the opening degree SWBn of the by-pass opening/closing damper 15 is controlled based upon the desired blow-out temperature TAOH of the second passage 7, in order that the air blown out from the first passage 6 is maintained at a low temperature. This makes it possible to free the passenger from feeling uncomfortable as when the hot air is blown to the upper half body in the initial period immediately after the feet mode is changed to the bilevel mode.

Even in the initial period immediately after the feet mode is changed to the face mode, the opening degree SWBn of the by-pass opening/closing damper 15 is controlled based upon the desired blow-out temperature TAOH of the second passage 7 during the feet mode, in order that the air blown out from the first passage 6 is maintained at a low temperature. This makes it possible to free the passenger from feeling uncomfortable as when the hot air is blown to the upper half body in the initial period when the feet mode is changed to the face mode.

In this embodiment, though the first passage 6 was used as the one for blowing chiefly the cool air to the upper half body of the passenger, it may be used as a passage for blowing chiefly the hot air to the feet of the passenger.

Embodiment 3

Figure 9:
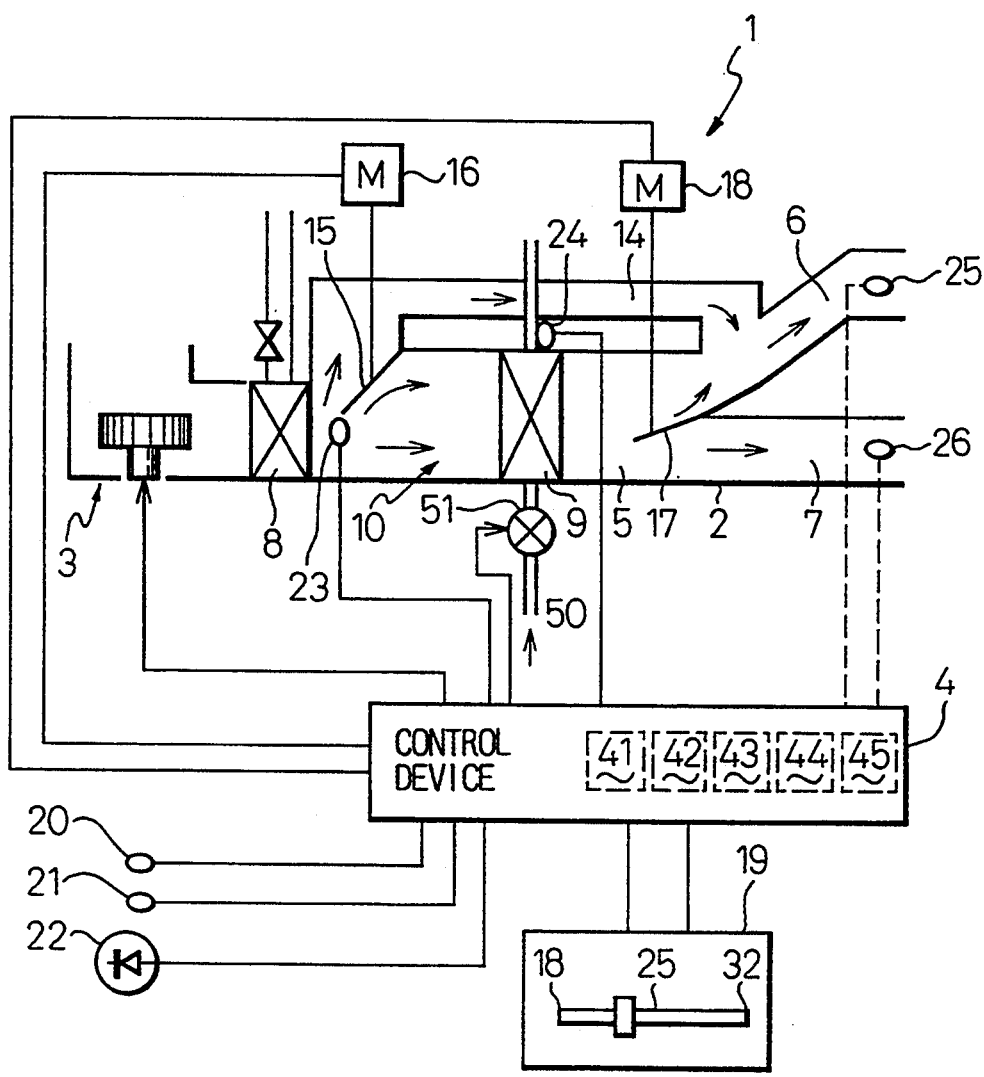
FIG. 9 is a diagram which schematically illustrates the constitution of the air-conditioning device of another embodiment according to the first aspect of the present invention.
Figure 10:
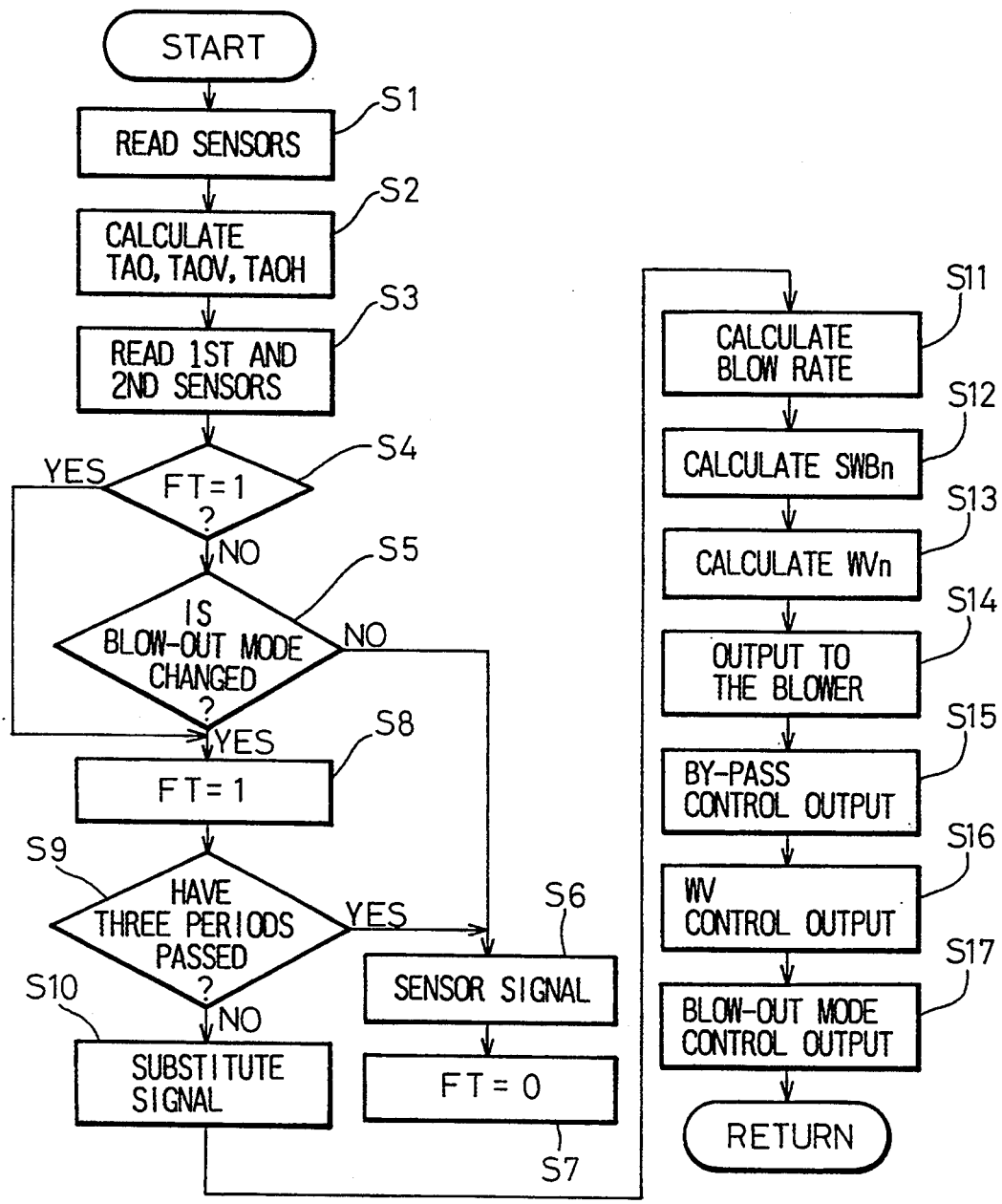
FIG. 10 is a flowchart illustrating the operation of the control device.

FIGS. 9 and 10 illustrate another embodiment of the air-conditioning device according to the first aspect of the present invention, wherein FIG. 9 is a diagram which schematically illustrates the constitution of the air-conditioning device 1 for automotive use.

According to this embodiment, the heating amount-adjusting means 10 is different from that of the first embodiment. In the heating amount-adjusting means 10 of this embodiment, the heater core 9 is arranged over the whole area of the main passage 5, and the amount of the cooling water supplied to the heater core 9 is adjusted to control the temperature of the air passing through the heater core 9. A hot water conduit 50 that supplies the cooling water to the heater core 9 is provided with an electrically operated water valve 51 on the upstream side of the hot water to adjust the flow rate of the hot water. The control device 4 adjusts the opening degree of the water valve 51 so that the temperature of the air passing through the heater core 9 is adjusted to be a temperature that is detected by the second temperature sensor 26. According to this embodiment, therefore, the temperature adjusting means is constituted by the heater core 9, water valve 51 and damper 15.

The operation of the control device 4 of this embodiment is shown in the flowchart of FIG. 10.

The operation of this embodiment is different from the operation of the flowchart (see FIG. 4) of the first embodiment with respect to the steps S13 and S16.

The step S13 calculates the opening degree Wvn of the water valve 51 instead of calculating the opening degree of the air-mix damper 12 (see first embodiment). Further, the step S16 outputs a control signal to the water valve 51 so as to obtain the opening degree WVn that was found in the step S13.

In this embodiment, the water valve 51 is exemplified as a means for adjusting the amount of the cooling water that passes through the heater core 9. It is, however, also allowable to employ an electromagnetic opening/closing valve in order to adjust the amount of the cooling water passing through the heater core 9 by controlling the duty ratio of the electromagnetic opening/closing valve. In this embodiment, furthermore, the amount of the cooling water is adjusted in order to adjust the temperature of the air passing through the heater core 9. However, it is also possible to adjust the mixing ratio of the cooling water of a relatively low temperature of after the heat is radiated through the heater core 9 and the cooling water of a relatively high temperature fed from the engine, and to flow the mixed cooling water into the heater core 9, in order to adjust the temperature of the air passing through the heater core 9.

According to this embodiment, furthermore, the heating amount-adjusting means 10 that adjusts the temperature of the air passing through the heater core 9 may be employed for the air-conditioning device of the aforementioned second aspect. In this case, the second temperature sensor 26 shown in FIG. 9 can be eliminated, and the opening degree of the water valve (or the duty ratio of the electromagnetic opening/closing valve) is controlled based upon the temperature detected by the water temperature sensor 24 that detects the temperature of the cooling water and the desired blow-out temperature of the second passage in order to control the blow-out temperature of the second passage 7, and the by-pass opening/closing damper 15 is controlled such that the temperature detected by the first temperature sensor 25 becomes the desired blow-out temperature of the first passage 6.

The above-mentioned embodiment dealts with the case where the present invention is applied to an air-conditioning device equipped with a cool air by-pass. The invention, however, can be adapted to any other air-conditioning devices provided they are so constituted that the temperature of one passage and the temperature of the other passage branched from a common main passage are changed by changing the temperature of one passage. Examples are shown in FIGS. 11 and 12.

Figure 11:
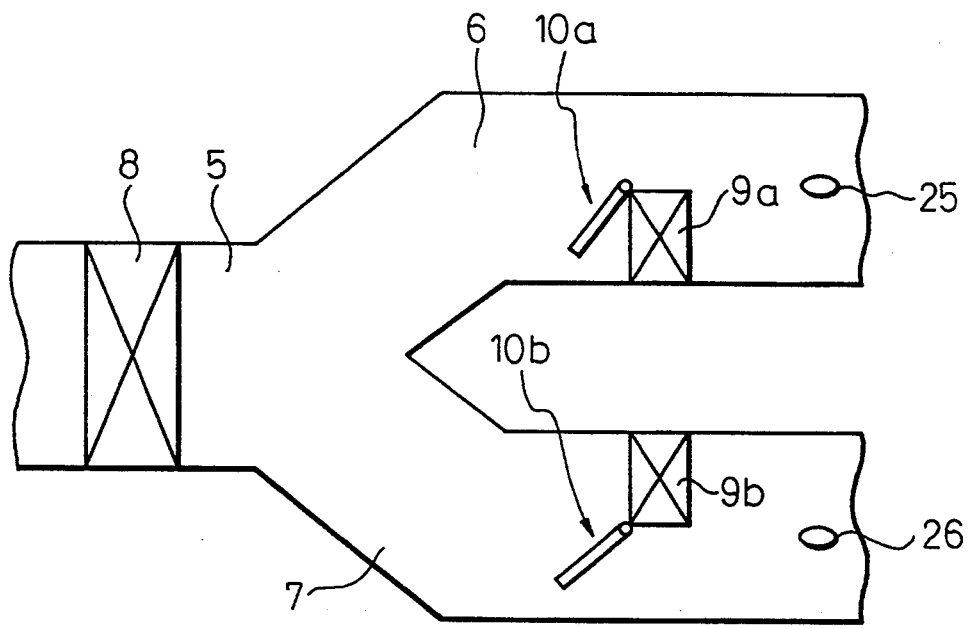
FIG. 11 is a diagram which schematically illustrates major portions in the duct used for the air-conditioning device according to the present invention.

An air-conditioning device of FIG. 11 has first and second heater cores (heating means) 9a, 9b as well as first and second heating amount-adjusting means 10a, 10b which are provided in the first passage 6 and in the second passage 7 independently from each other. Here, the first and second heating amount-adjusting means 10a, 10b are the first and second temperature adjusting means of the first aspect of the present invention. When the second temperature sensor 26 is omitted in the constitution of FIG. 11, the first heating amount-adjusting means 10a is the temperature adjusting means of the second aspect of the invention and when the first temperature sensor 25 is omitted, the second heating amount-adjusting means 10b is the temperature adjusting means of the second aspect.

Figure 12:
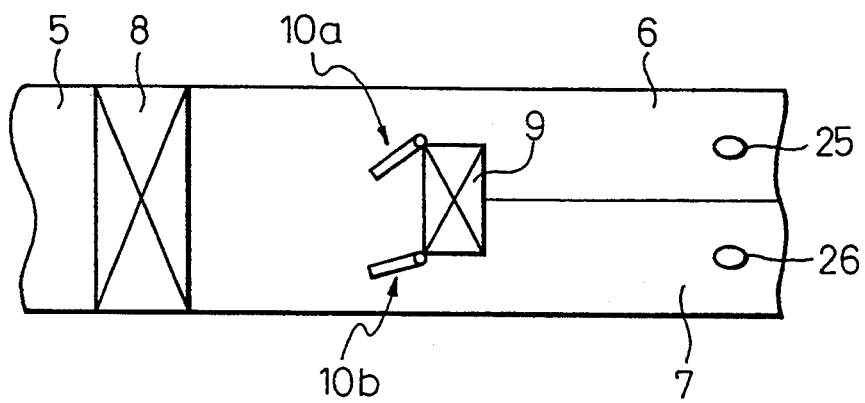
FIG. 12 is a diagram which schematically illustrates the constitution inside the duct used for the air-conditioning device according to the present invention.
Figure 13:
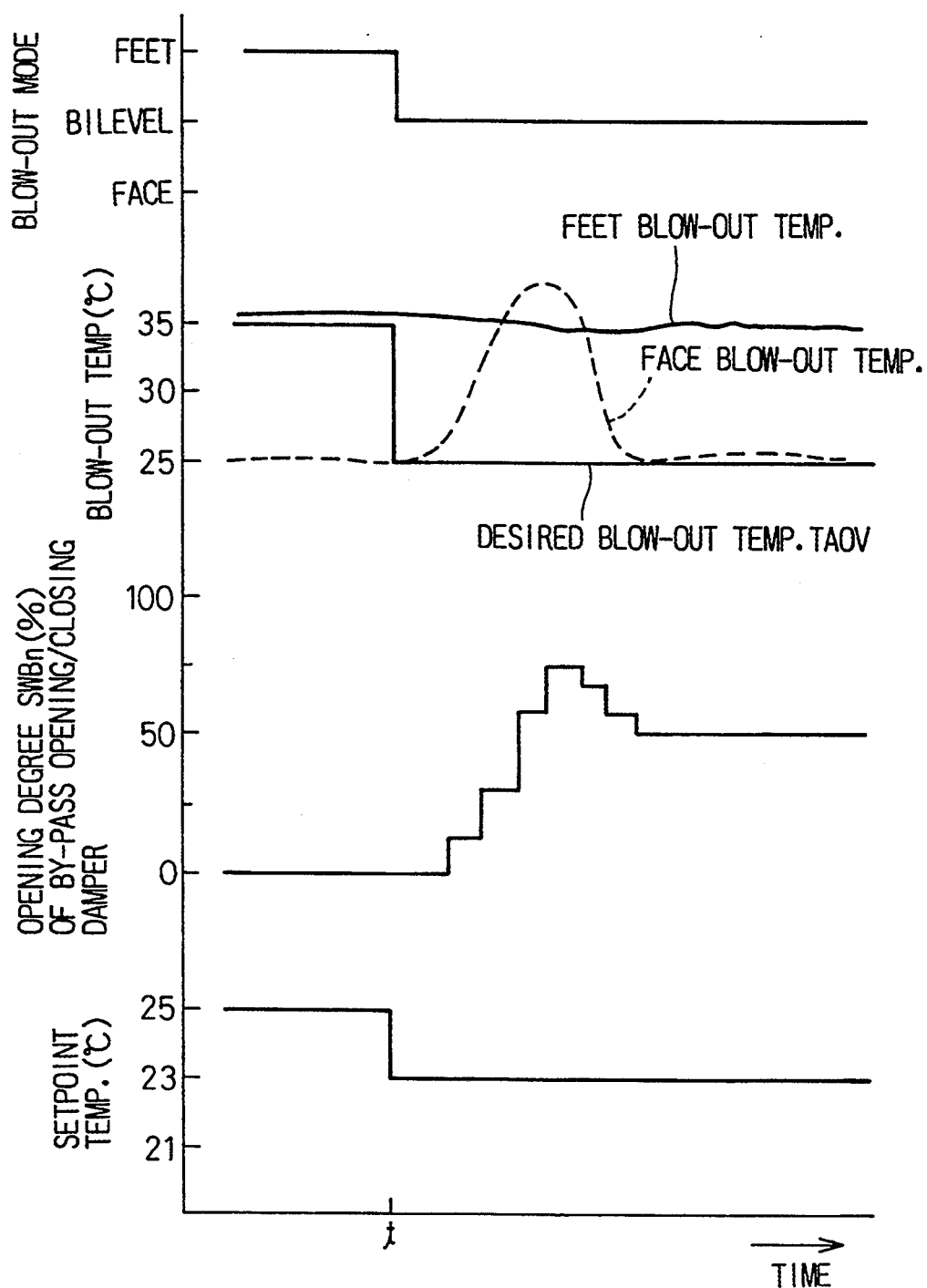
FIG. 13 is a time chart illustrating the operation according to a prior art.

In an air-conditioning device of FIG. 12, a common heater core (heating means) 9 is provided at a portion where the air flows into the first passage 6 and the second passage 7, and a first heating amount-adjusting means 10a is provided in the first passage 6 independently from a second heating amount-adjusting means 10b that is provided in the second passage 7. Even in this modified example of FIG. 12, the first and second heating amount-adjusting means 10a and 10b are the first and second temperature adjusting means of the first aspect. In the constitution of FIG. 12, furthermore, the first heating amount-adjusting means 10a is the temperature-adjusting means of the second aspect when the second temperature sensor 26 is omitted, and the second heating amount-adjusting means 10b is the temperature-adjusting means of the second aspect when the first temperature sensor 25 is omitted.

In the aforementioned embodiments, furthermore, the first passage was described to be one for blowing chiefly the cool air to the upper half body of the passenger and the second passage was described to be one for blowing chiefly the hot air to the feet of the passenger, which, however, may be reversed.

Moreover, though the other desired blow-out temperature is used as the substitute temperature, it is also allowable to use the temperature detected by the temperature sensor in the other air passage as the substitute temperature or to use a constant set within a temperature range of the other air passage.

Furthermore, though the embodiments employ a control period as a means for measuring a predetermined period of time for using a substitute temperature, it is possible to use any other means. The predetermined period of time for using the substitute temperature is set depending upon the response characteristics of the temperature sensor and is not, hence, limited to the one employed by the present invention. The predetermined period of time for using the substitute temperature may vary depending upon a range of change in the temperature or upon the blow rate.

The air-conditioning device according to the first aspect of the present invention makes it possible to reliably blow from one passage air of a temperature which is lower or higher than the temperature of the air which is blown from the other passage in the initial period immediately after the air-conditioning operation in which either the first passage or the second passage is closed has changed into the air-conditioning operation in which it is opened, irrespective of the temperature detected by the temperature sensor in one passage. That is, even in the initial period of change, the air of a suitable temperature can be blown from one passage.

Furthermore, the air-conditioning device according to the second aspect of the present invention makes it possible to reliably blow from the first passage air of a temperature which is lower or higher than the temperature of the air which is blown from the second passage in the initial period immediately after the air-conditioning operation in which the first passage is closed has changed into the air-conditioning operation in which it is opened, irrespective of the temperature detected by the temperature sensor in the first passage. That is, even in the initial period of change, the air of a suitable temperature can be blown from the first passage.

We claim:

1. An air-conditioning device comprising:
   a main passage through which air flows into a room;
   a first passage branched from said main passage;
   a second passage branched from said main passage;
   a passage opening/closing means which opens or closes said first passage and said second passage;
   a first temperature adjusting means which adjusts the temperature of the air passing through said first passage;
   a second temperature adjusting means which adjusts the temperature of the air passing through said second passage;
   a first temperature sensor which detects the temperature of the air passing through said first passage;
   a second temperature sensor which detects the temperature of the air passing through said second passage;
   a first blow-out temperature determining means which determines a desired below-out temperature of the air blowing out from said first passage;
   a second blow-out temperature determining means which determines a desired blow-out temperature of the air blowing out from said second passage;
   a judging means which judges whether either one of said first passage or said second passage is shifted from the closed state to the open state by said passage opening/closing means;
   a first control means which, when it is so judged by said judging means that said either one of the passages is shifted from the closed state to the open state, works to control said temperature adjusting means of said one passage for a predetermined period of time immediately after the judgement based upon a desired blow-out temperature of the other passage of either said first passage or said second passage end upon said desired blow-out temperature of said one passage; and
   a second control means which, after the predetermined period of time has passed immediately after said judgement, works to control said temperature adjusting means of said one passage based upon a value detected by said temperature sensor provided in said one passage and upon said desired blow-out temperature of said one passage.

2. An air-conditioning device according to claim 1, wherein said first temperature adjusting means comprises:
   a heating amount-adjusting means which includes;
   a heating means which heats the air in said main passage;
   a heat-adjusting by-pass that by-passes said heating means in said main passage; and
   an air-mix damper that adjusts the amount of the air passing through said heating means and the amount of the air passing through said heat-adjusting by-pass;
   a cool air by-pass which directly guides the cool air to said first passage by-passing said heating-amount adjusting means; and a cool air by-pass opening/closing damper that adjusts the amount of the cool air passing through the cool air by-pass;

and said second temperature adjusting means comprises:

said heating amount-adjusting means.

3. An air-conditioning device according to claim 1, wherein said first temperature adjusting means comprises:

a heating means which heats all of the air passing through said main passage;

a heating amount-adjusting means which adjusts the amount of heating of the air by the heating means;

a cool air by-pass which directly guides the cool air to said first passage by-passing said heating means; and a by-pass opening/closing damper that adjusts the amount of the cool air passing through the cool air by-pass; and said second temperature adjusting means comprises: said heating means and said heating amount-adjusting means.

4. An air-conditioning device for automotive use according to claim 1, wherein said first passage is one that blows chiefly the cool air to the upper half body of a passenger in the room, and said second passage is one that blows chiefly the hot air to the feet of the passenger in the room.

5. An air-conditioning device comprising:

a main passage through which air flows into a room;
a first passage branched from said main passage;
second passage branched from said main passage;
a passage opening/closing means which opens or closes said first passage and said second passage;
a temperature adjusting means which adjusts the temperature of the air passing through said first passage;
a temperature sensor which detects the temperature of the air passing through said first passage;
a blow-out temperature determining means which determines a desired blow-out temperature of the air blowing out from said first passage;
a judging means which judges whether said first passage is shifted from the closed state to the open state by said passage opening/closing means;
a first control means which, when it is so judged by said judging means that said first passage is shifted from the closed state to the open state, works to control said temperature adjusting means for a predetermined period of time immediately after the judgement based upon a substitute blow-out temperature of said second passage and upon said desired blow-out temperature of said first passage; and a second control means which, after the predetermined period of time has passed immediately after said judgement, works to control said temperature adjusting means based upon a value detected by said temperature sensor of said first passage and upon said desired blow-out temperature of said first passage.

6. An air-conditioning device according to claim 5, wherein said temperature adjusting means comprises:

a heating amount-adjusting means which includes;
a heating means which heats the air in said main passage;
a heat-adjusting by-pass that by-passes said heating means in said main passage; and
an air-mix damper that adjusts the amount of the air passing through said heating means and the amount of the air passing through said heat-adjusting by-pass;
a cool air by-pass which directly guides the cool air to said first passage by-passing said heating-amount adjusting means; and
a by-pass opening/closing damper that adjusts the amount of the cool air passing through the cool air by-pass.

7. An air-conditioning device according to claim 5, wherein said temperature adjusting means comprises:

a heating means which heats all of the air passing through said main passage;
a heating amount-adjusting means which adjusts the amount of heating of the air by the heating means;
a cool air by-pass which directly guides the cool air to said first passage by-passing said heating means; and
a by-pass opening/closing damper that adjusts the amount of the cool air passing through the cool air by-pass.

8. An air-conditioning device for automotive use according to claim 5, wherein said first passage is one that blows chiefly the cool air to the upper half body of a passenger in the room, and said second passage is one that blows chiefly the hot air to the feet of the passenger in the room.

9. An air-conditioning device for automotive use according to claim 5, wherein said first passage is one that blows chiefly the hot air to the feet of the passenger in the room, and said second passage is one that blows chiefly the cool air to the upper half body of the passenger in the room.

* * * * *